US006214349B1

(12) United States Patent
Segelman

(10) Patent No.: US 6,214,349 B1
(45) Date of Patent: Apr. 10, 2001

(54) COMPOSITION FOR LIMITING THE ASSIMILATION OF DIETARY FAT AND METHODS OF MAKING AND USING SAME

(75) Inventor: Alvin Burton Segelman, Orem, UT (US)

(73) Assignee: Nature's Sunshine Products, Inc., Provo, UT (US)

( * ) Notice: Subject to any disclaimer, the term of this patent is extended or adjusted under 35 U.S.C. 154(b) by 0 days.

(21) Appl. No.: 09/240,081

(22) Filed: Jan. 28, 1999

Related U.S. Application Data

(63) Continuation of application No. 08/614,463, filed on Mar. 12, 1996, now abandoned.

(51) Int. Cl.[7] ..................... A61K 35/78

(52) U.S. Cl. ..................... 424/195.1; 424/451; 424/464; 424/485; 514/54

(58) Field of Search ..................... 424/195.1, 464, 424/451, 485; 514/54

(56) References Cited

U.S. PATENT DOCUMENTS

| | | | | |
|---|---|---|---|---|
| 4,737,364 | * | 4/1988 | Kalogris | 424/195.1 |
| 5,516,524 | * | 5/1996 | Kais et al. | 424/439 |
| 5,591,836 | * | 1/1997 | Mazur et al. | 536/6.1 |
| 5,658,571 | * | 8/1997 | Gopalan et al. | 424/195.1 |

FOREIGN PATENT DOCUMENTS

6227996 * 8/1994 (JP) .

OTHER PUBLICATIONS

Chemical Abstracts 112(13): 115812q, 1990.*

* cited by examiner

*Primary Examiner*—Francisco Prats
(74) *Attorney, Agent, or Firm*—Parsons, Behle & Latimer

(57) ABSTRACT

The present invention is an dietary supplement which inhibits the assimilation of dietary fat during digestion, and method of making and using the same. The composition includes surfactant and non-digestible dietary fiber. In a preferred embodiment of the invention, the composition further comprises an emulsifying agent. The composition may be taken before, during or after eating.

3 Claims, 1 Drawing Sheet

COMPOSITION FOR LIMITING THE ASSIMILATION OF DIETARY FAT AND METHODS OF MAKING AND USING SAME

This application is a continuation of U. S. patent application Ser. No. 08/614,463, filed Mar. 12, 1996 now abandoned.

BACKGROUND OF THE INVENTION

A. Field of the Invention.

This invention relates to the field of compositions for limiting the assimilation of dietary fat, and methods of making and using such compositions. More specifically, this invention relates to the field of compositions that inhibit dietary fat assimilation by physically entrapping the fat, and methods for making and using such compositions.

B. Description of Related Art.

People are becoming increasingly aware of the importance of limiting the ingestion and uptake of dietary fat. As a result, low fat foods are rapidly gaining in popularity. Such low fat foods are, however, only available for limited types of foods and are often less enjoyable to eat. Due to these deficiencies of low fat food, alternate means of reducing the amount of dietary fat have been tried.

One method of limiting the uptake of dietary fat is to consume dietary fibers which sequester the fat in a less-digestible form. A limitation of such dietary fibers is that they are ionically-charged, and they consequently sequester physiologically important nutrients and minerals such as phosphate. This sequestration limits the bioavailability of such nutrients and minerals.

SUMMARY OF THE INVENTION

There is a need for a dietary supplement which limits the assimilation of dietary fat without reducing the bioavailability of dietarily important nutrients and minerals. The present invention is based on the unexpected discovery that a surfactant in combination with non-digestible dietary fiber will limit the assimilation of dietary fat during digestion. The surfactant of the present composition is advantageously non-ionic (uncharged) and, therefore, disaggregates dietary fat without sequestering important nutrients and minerals. The disaggregated dietary fat can then combine with non-digestible dietary fiber to form a non-digested product which is subsequently eliminated. In a preferred embodiment of the invention, the composition further includes a food grade emulsifying agent.

It is an object of the invention to provide a dietary supplement which inhibits the assimilation of dietary fat. It is a feature of the invention that the dietary composition may be adapted to limit the assimilation of different types of dietary fats. It is an advantage that the invention may conveniently be taken before, during or after eating.

It is an object of the invention to provide a composition which limits the assimilation of dietary fat by physically entrapping the fat. It is a feature of the invention that the dietary composition does not significantly reduce the bioavailability of important nutrients and minerals. It is an advantage of the invention that the dietary supplement will not reduce the bioavailability of dietary phosphate.

It is an object of the invention to provide an oral dosage form of the dietary supplement which limits the assimilation of dietary fat during digestion. It is a feature of the invention that the dietary composition may be a separate oral dosage form, such as a tablet, capsule or powder. It is also a feature of the invention that the oral composition may be ingested with a meal to limit dietary fat assimilation. It is an advantage of the invention that the oral dosage form of the dietary composition may varied according to the desired use of the composition.

It is an object of the invention to provide a method for making an oral dietary composition which limits the assimilation of dietary fat. It is a feature of the invention that the method of making the dietary composition will include incorporating the composition as part of an oral dosage form such as a capsule, tablet or powder. It an advantage of the invention that the method of making the composition will include incorporating non-digestible dietary fibers.

These and other objects, features and advantages of the invention will be clear to a person of ordinary skill in the art upon reading this specification in light of the appended drawings.

DETAILED DESCRIPTION OF A PREFERRED EMBODIMENT

Figure 1:
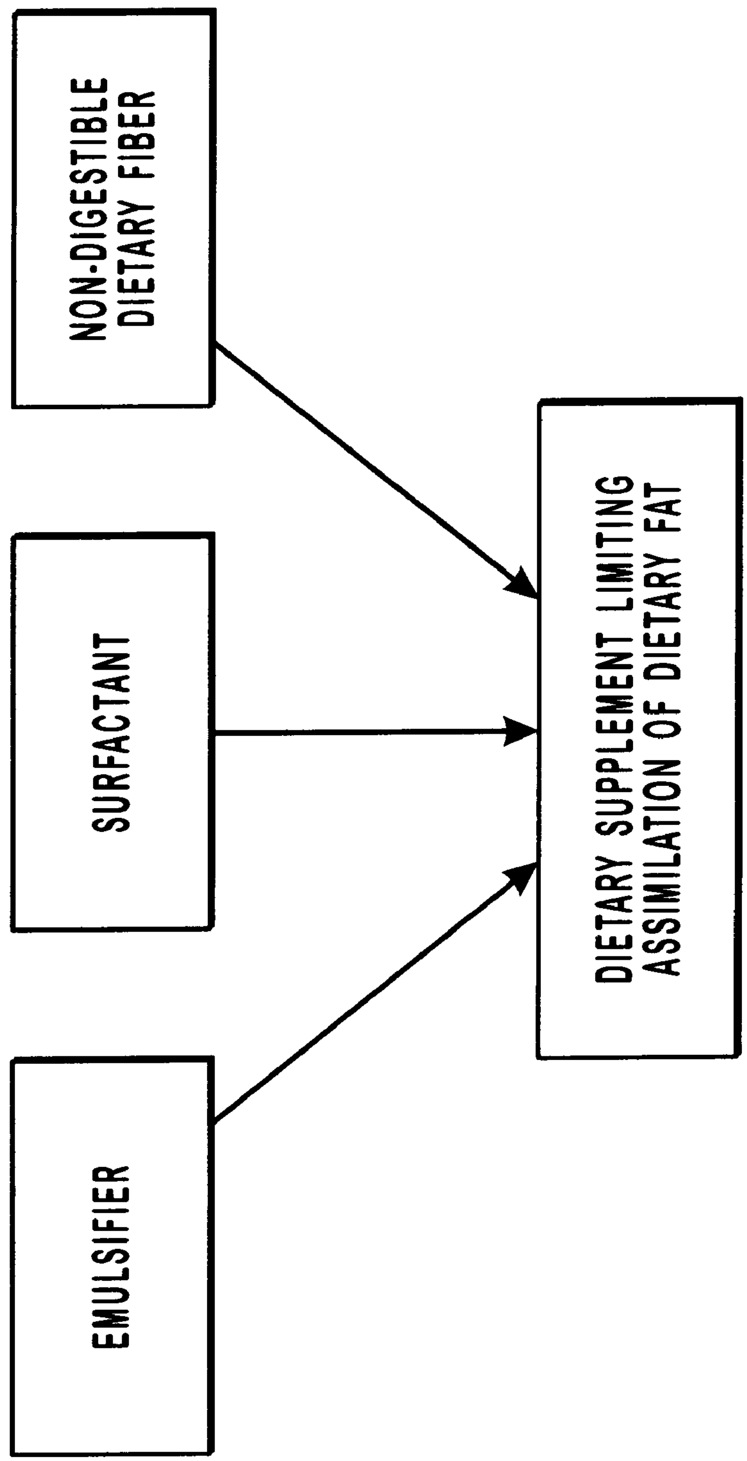
FIG. 1 depicts a diagram of the components of the present invention.

The present invention of dietary supplement is intended to be taken as an oral dosage form and limits the assimilation of dietary fats during digestion. Referring to FIG. 1, the composition of the present invention includes at least one surfactant and non-digestible dietary fiber. In a preferred embodiment of the invention, the composition may also include a food grade emulsifying agent. These components are preferably food-grade ingredients in highly purified, semi-purified or crude form. The components of the present invention lend themselves to the incorporation into, and the production of, dietary supplements which are especially useful in the form of orally-administrable dosage forms including but not limited to capsules, tablets and powders (hereinafter referred to as "oral dosage forms").

Description of the Components

Non-digestible Dietary Fiber—Non-digestible dietary fiber is preferably of food grade quality. Such fiber may include, but is not limited to, guar gum (*Cyamopsis tetragonolobus* (L.) Taub.), Psyllium (*Plantago syllium* L. or *P. indica* L.) husks, Acacia gum (*Acacia senegal* (L.) Willdenow or other related species), Tragacanth (*Astragalus gummifer Labillardiera* and other related asiatic species), and Mesquite gum (*Prosopis juliflora* (Sw.) Dc. and *P. glandulosa Torr*.)

Surfactant—Surfactant may be provided as partially-purified extract, concentrated extract or in the form of herbs or parts of herbs. In the preferred embodiment of the invention, the surfactant contains a saponin. Sources of saponin, including partially-purified extract, concentrated extract or a herb or parts of herbs, will include, but are not limited to, the following: chickweed (*Stellaria media* (L.) Cyr.); Licorice root or rhizome (*Glycyrrhiza glabra* L.), including Spanish (*G. typica* Reg. & Herd.), Russian (*G. glandulifera* Wald. & Kit.) and Persian (*G. violacea Boissier*); Horse chestnut seed (*Aesculus hippocastanum* L.); Butcher's broom root and rhizome (*Ruscus aculeatus* L.); Senega rhizome and root (Snakeroot) (*Polygala senega* L.); Common ivy leaf and wood (*Hedera helix* L.); Primrose (*Primula veris* L.(=*P. officinalis* (L.) Hill.); Gotu kola (Indian pennywort, Hydrocotyle) (*Centella asiatica* (L.)

HRB); marigold (*Calendula officinalis* L.) flowers and flower heads, root and rhizome; Korean or Chinese ginseng (*Panax ginseng C.A. Meyer*) as well as other ginseng species including American (*P. quinquifolium* L.) and Japanese (*P. japonicus C.A. Meyer*); Siberian (*Eleutherococcus senticosus Maxim.*) root and rhizome; Quillaja (*Quillaja saponaria Molina*) and related species (*Q. smegmaderos* DC.) trunk bark; soapwort (*Saponaria officinalis* L.) stem, leaf, root and rhizome; gypsophilas (Gypsophila spp.) root and underground parts; all parts of alfalfa (*Medicago sativa* L.); Sarsaparilla species (Smilax spp.); Yucca species (Yucca spp.); all parts of Amaranthus species (Amaranthus spp.); soybeans (*Glycine Max* (L.) Merr.), whole plant; common nettle (*Urtica dioica* L.) all parts; yams (Dioscorea spp.); Rupture Wort (*Herniaria glabra* L., *H. hirsuta* L.); aspargus (*Asparagus officinalis* L.), all parts; Fenugreek (*Trigonella foenum-graecum* L.) seed; Agave species (including *Agave Sisalana Perr.* and *A. fourcroydes Lem.*; figwort (*Ranunculus ficaria* L.) and Urban ginseng (*Mimosa tenuislora* (Willd.) poiret) bark.

Emulsifying Agent—The emulsifying agent is preferably a food grade emulsifying agent. Such emulsifiers may include, but are not limited to, lecithin, TWEEN (polyethylene glycol ether) and oleic acid. In the preferred embodiment of the invention, the emulsifying agent is lecithin, which is obtained from soybean or eggs.

Composition of the Invention

The components of the invention are readily obtainable commercially. The non-digestible dietary fiber, surfactant and emulsifying agent may be (nearly) salt-free, a pharmaceutically suitable salt or a food grade supplement. If the surfactant or emulsifying agent is partially or highly purified extract, it may be mixed with an inert carrier. The weight percentages of the components in the dietary composition are based on the total weight of the non-digestible dietary fiber, the surfactant and emulsifying agent.

For non-digestible dietary fiber, the effective dosage level can range from about 5 to about 90 weight percent. In the most preferred embodiment of the invention, the amount of non-digestible dietary fiber will be about 76 weight percent. The effective dosage level for surfactant can range from about 5 to about 90 weight percent. In the most preferred embodiment of the invention, the amount of surfactant will be about 20 weight percent. The effective dosage level for the emulsifying agent can range from about 0 to about 20 weight percent. In the most preferred embodiment of the invention, the amount of emulsifying agent will be about 4 weight percent.

The dietary composition of the present invention may beneficially also be admixed with various inactive excipients, carriers, diluents, lubricants and other so-called "pharmaceutical aids" (adjuvants) and then formed into capsules and tablets. Examples of inactive excipients, carriers, diluents, lubricants, disintegrants, and so-called "pharmaceutical aids" include but are not limited to the following: silica, silica gel, cellulose and microcrystalline cellulose, cross-carmelose sodium, dicalcium phosphate, various gums (such as acacia, tragacanth, guar, and xanthan), alginic acid, sodium alginate, corn syrup solids, rice syrup solids, maltodextrin, hydroxypropylcellulose, hydroxypropylmethyl cellulose, corn and potato starches and other plant starches, modified potato starch, stearins, stearic acid, carboxymethyl cellulose, sodium carboxymethyl cellulose, dextrose, fructose, bone meal, oyster shell, isolated soy protein, potassium carbonate, sodium starch glycolate, sorbitol, talc, methylcellulose, polyethylene glycol 400 and other polyethylene glycols, sorbic acid and potassium sorbate, sodium lauryl sulfate, sodium phosphate monobasic, sodium sulfate, potassium bicarbonate, mannitol, lactose, corn flower, zinc gluconate, zinc oxide, xylitol, calcium silicate, sodium ascorbate, citric acid, calcium carbonate, carnauba wax, oils (natural, partial or fully hydrogenated, such as olive oil, peanut oil, cottonseed oil, rape-seed oil, corn oil), magnesium stearate and plant fibers including, but not limited to, beet root fiber and tomato fiber. Additional inactive excipients, carriers, diluents, lubricants and adjuvants which may be used with the composition are disclosed in Remington's Pharmaceutical Sciences, Ed. 18 (A. R. Gennaro, ed., Mack Publishing Co., Easton, Pa., 1990) and in the Handbook of Pharmaceutical Excipients, Ed. 2 (A. Wade and P. J. Weller, eds., American Pharmaceutical Association, Washington, D.C., and the Pharmaceutical Press, London Publishers, 1994), both of which are incorporated by reference herein in their entirety.

The amount of the dietary supplement per oral dosage may be varied according to the preferred size of the capsule or tablet. For capsules, the total amount of dietary supplement may range from about 400 mg to about 600 mg, although greater or lesser amounts of supplement are within the scope of the invention. For tablets, the total amount of dietary supplement may range from about 4–500 mg to about 1.5–2 grams, although greater or lesser amounts of supplement are within the scope of the invention.

Method of Making Oral Dosage Forms

The present invention is intended to be taken by mouth together with food. Other equivalent oral dosage forms are within the scope of the invention, as will be readily appreciated by those of skill in the art.

For the manufacture of capsules, tablets (formed into tablets by direct compression only) and powders, it is suitable to mix the appropriate amounts of the components (emulsifier, surfactant and non-digestible dietary fiber), followed by mixing in a blender or other suitable mixing equipment to afford a homogeneous and powdered free flowing mass which can then be encapsulated or tableted using suitable equipment. Encapsulation and tableting procedures are well-known to those of skill in the art. These procedures are also disclosed in Remington's Pharmaceutical Sciences, Ed. 18, op cit. (especially pages 1615–1675) and in the Handbook of Pharmaceutical Excipients, Ed. 2, op cit., both of which are incorporated by reference herein in their entirety.

For the manufacture of tablets using a wet granulation process, the ingredients of such tablets are combined, wet-granulated, dried and suitably ground and/or mixed using suitable equipment to afford a homogeneous mixture which is then conveniently pressed into tablets of the desired weight and shape using suitable equipment.

Wet granulation processes for tableting are well-known to those of skill in the art. These procedures are also disclosed in Remington's Pharmaceutical Sciences, Ed. 18, op cit., and in the Handbook of Pharmaceutical Excipients, Ed. 2, op cit, which are incorporated by reference herein in their entirety.

Powdered forms of the dietary composition will prepared according to the same procedures which are used for capsules, except that the powder will not be encapsulated. Powdered forms may also be prepared by grinding tablets.

Method of Using the Dietary Supplement

The composition of the present invention may be taken in combination with food shortly before, during or after eating. When the composition is taken as a separate oral dosage form, generally from 1 to 6 or more, preferably 4,oral doses may be taken from about 1 to 3 times a day. Powdered forms of the invention may be consumed by dissolving or suspending about 1 teaspoon (4 grams) of powder in water or other suitable beverage such as juice.

Best Mode and Examples of Compositions

The following examples include embodiments within the scope of the invention, although the invention is not intended to be limited by or to these embodiments. These examples illustrate best modes of the invention contemplated by the inventor.

EXAMPLE 1

CAPSULES CONTAINING THE DIETARY SUPPLEMENT

Per Capsule:

| Ingredient | Amount |
|---|---|
| Lecithin | 20 mg |
| Chickweed | 80 mg |
| Guar Gum | 175 mg |
| Psyllium husk | 175 mg |

The required amount (scale-up) of the prepared and mixed formulation is used to fill gelatin capsules using suitable equipment, as is readily known to those of skill in the art.

EXAMPLE 2

TABLETS CONTAINING THE DIETARY SUPPLEMENT

Per Tablet:

| Ingredient | Amount |
|---|---|
| Lecithin | 20 mg |
| Chickweed | 80 mg |
| Guar Gum | 175 mg |
| Psyllium husk | 175 mg |
| Stearic acid | 15 mg |
| Silica gel | 10 mg |
| Magnesium stearate | 3 mg |

The required amounts (scale-up) of the individual components are treated as follows. The lecithin, chickweed, guar gum and Pysllium husk are combined, wet-granulated, dried and ground, after which the remaining components are blended with the dried granulation mixture and the resultant homogeneous powder is pressed into tablets (for example, 7⁄16" standard round) using suitable equipment.

While the present invention has been described and illustrated in conjunction with a number of specific embodiments, those skilled in the art will appreciate that variations and modifications may be made without departing from the principles of the invention as herein illustrated, described and claimed.

The invention may be embodied in other specific forms without departing from the spirit or essential characteristics thereof. The present embodiments are to be considered in all respects as illustrative, and not restrictive. The scope of the invention, is therefore, indicated by the appended claims rather than by the foregoing description, and all changes which come within the meaning and range of equivalency of the claims are to be embraced within their scope.

I claim:

1. A dietary composition comprising:

(a) non-digestible dietary fiber comprising guar gum and Psyllium husk;

(b) saponin-containing surfactant comprising chickweed; and (c) an emulsifying agent comprising lecithin;

wherein said non-digestible dietary fiber is present in an amount of about 78 weight percent, said saponin-containing surfactant is present in an amount of about 18 weight percent, and said emulsifying agent is present in an amount of about 4 weight percent, said weight percentages being based on the total weight of said non-digestible dietary fiber, saponin-containing surfactant, and emulsifying agent;

wherein said non-digestible dietary fiber, said saponin-containing surfactant, and said emulsifying agent are present in an oral dosage form; and wherein said composition limits the assimilation of dietary fat during digestion.

2. A dietary composition comprising:

(a) non-digestible dietary fiber as guar gum and Psyllium husk;

(b) saponin-containing surfactant as chickweed; and (c) an emulsifying agent as lecithin;

wherein said guar gum is present at about 39 weight percent, said Psyllium husk is present at about 39 weight percent, said chickweed is present at about 18 weight percent, and said emulsifying agent is present at about 4 weight percent, said weight percentages being based on the total weight of said dietary fiber, surfactant and emulsifying agent;

wherein said non-digestible dietary fiber, said surfactant and said emulsifying agent are present in an oral dosage form; and wherein said composition limits the assimilation of dietary fat during digestion.

3. A dietary composition for limiting the assimilation of dietary fat during digestion comprising:

(a) about 78 weight percent of a non-digestible dietary fiber comprising guar gum and Psyllium husk, (b) about 18 weight percent of a saponin-containing surfactant comprising chickweed, and (c) about 4 weight percent of an emulsifying agent comprising lecithin.

* * * * *